(12) United States Patent
Morikawa et al.

(10) Patent No.: US 12,188,554 B2
(45) Date of Patent: Jan. 7, 2025

(54) CONTROL APPARATUS FOR VEHICLE

(71) Applicant: HONDA MOTOR CO., LTD., Tokyo (JP)

(72) Inventors: Masaki Morikawa, Tokyo (JP); Kazuya Sakurai, Tokyo (JP); Noriaki Suzuki, Tokyo (JP); Natsuki Ito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/590,962

(22) Filed: Feb. 29, 2024

(65) Prior Publication Data
US 2024/0328506 A1 Oct. 3, 2024

(30) Foreign Application Priority Data
Mar. 31, 2023 (CN) .......................... 202310336518.1

(51) Int. Cl.
*F16H 59/02* (2006.01)
*B60K 20/06* (2006.01)
*F16H 59/04* (2006.01)
*F16H 59/08* (2006.01)

(52) U.S. Cl.
CPC ......... *F16H 59/0204* (2013.01); *B60K 20/06* (2013.01); *F16H 59/044* (2013.01); *F16H 59/08* (2013.01); *F16H 2059/0221* (2013.01); *F16H 2059/082* (2013.01)

(58) Field of Classification Search
CPC ............. F16H 59/0204; F16H 59/0217; F16H 2059/0221; F16H 2059/0247; F16H 2059/082; F16D 2500/5085; F16D 2500/50858; B60K 20/06; B60W 30/18072; B60W 30/182; B60W 2030/1809
See application file for complete search history.

(56) References Cited

U.S. PATENT DOCUMENTS

| | | | |
|---|---|---|---|
| 11,180,149 B2 * | 11/2021 | Choi ...................... B60W 10/08 |
| 11,554,780 B2 * | 1/2023 | Choi ................... B60W 50/085 |
| 11,926,210 B1 * | 3/2024 | Suzuki .................... F16H 61/02 |
| 2012/0046841 A1 * | 2/2012 | Wurthner .............. B60W 10/02 |
| | | | 701/55 |

(Continued)

FOREIGN PATENT DOCUMENTS

| | | | | |
|---|---|---|---|---|
| FR | 3127185 A1 | * | 3/2023 | |
| JP | 2005226701 A | | 8/2005 | |
| WO | WO-2012110062 A1 | * | 8/2012 | ................ B60L 7/18 |

OTHER PUBLICATIONS

WO2012/110062 translation (Year: 2012).*

*Primary Examiner* — Timothy Hannon
(74) *Attorney, Agent, or Firm* — CKC & Partners Co., LLC (57) ABSTRACT

Provided is a control apparatus for vehicle that enables a driver to activate and deactivate a freewheeling mode at his/her discretion. A control apparatus 1 for vehicle switches the vehicle to a freewheeling mode in which power generated by an engine 2 of the vehicle is not transmitted to drive shafts 7 of the vehicle. The control apparatus 1 for vehicle includes: a decelerator having a plurality of deceleration gear stages for changing deceleration of the vehicle; and a manipulator 10 provided on steering 11 of the vehicle and configured to allow selection of the freewheeling mode in accordance with an operation performed by a driver. The vehicle transitions to the freewheeling mode upon the freewheeling mode being selected through an operation of the manipulator 10.

5 Claims, 3 Drawing Sheets

| Current State | Operation | Behavior |
|---|---|---|
| D Range | UP Paddle Pulling | Activate smart coasting |
| | UP Paddle Long Pulling | Activate fixed-shift-mode coasting |
| Smart Coasting | DOWN Paddle Pulling | Transition to second gear stage in smart mode (Deactivate coasting) |
| | DOWN Paddle Long Pulling | Transition to second gear stage in fixed shift mode (Deactivate coasting) |
| | Accelerator Pressing | Transition to D range (Deactivate coasting) |
| Fixed-Shift-Mode Coasting | DOWN Paddle Pulling | Transition to first gear stage in fixed shift mode (Deactivate coasting) |
| | DOWN Paddle Long Pulling | Transition to first gear stage in smart mode (Deactivate coasting) |

(56) References Cited

U.S. PATENT DOCUMENTS

| | | | |
|---|---|---|---|
| 2012/0150396 A1* | 6/2012 | Ajimoto | F16H 61/0213 |
| | | | 701/52 |
| 2017/0313316 A1* | 11/2017 | Shiraishi | B60W 10/06 |
| 2019/0308638 A1* | 10/2019 | Ritter | B60K 35/10 |
| 2023/0235818 A1* | 7/2023 | Ekelund | F16H 61/0213 |
| | | | 701/61 |

* cited by examiner

| Current State | Operation | Behavior |
| --- | --- | --- |
| D Range | UP Paddle Pulling | Activate smart coasting |
| | UP Paddle Long Pulling | Activate fixed-shift-mode coasting |
| Smart Coasting | DOWN Paddle Pulling | Transition to second gear stage in smart mode (Deactivate coasting) |
| | DOWN Paddle Long Pulling | Transition to second gear stage in fixed shift mode (Deactivate coasting) |
| | Accelerator Pressing | Transition to D range (Deactivate coasting) |
| Fixed-Shift-Mode Coasting | DOWN Paddle Pulling | Transition to first gear stage in fixed shift mode (Deactivate coasting) |
| | DOWN Paddle Long Pulling | Transition to first gear stage in smart mode (Deactivate coasting) |

CONTROL APPARATUS FOR VEHICLE

This application is based on and claims the benefit of priority from Chinese Patent Application No. CN202310336518.1, filed on 31 Mar. 2023, the content of which is incorporated herein by reference.

BACKGROUND OF THE INVENTION

Field of the Invention

The present invention relates to a control apparatus for vehicle.

Related Art

In recent years, research and development have been conducted to improve fuel efficiency, which contributes to an increase in energy efficiency, in order to ensure that more people can have access to affordable, reliable, sustainable, and advanced energy.

For example, a known vehicle is equipped with a coasting mode (also referred to as a freewheeling mode) for the purpose of improving fuel efficiency. When this coasting mode is activated, the clutch is automatically disengaged in response to a driver lifting his/her foot off the accelerator pedal, so that the engine idles, and the speed gradually decreases.

Examples of types of roads where the coasting mode is used include gentle slopes and highways. The coasting mode is effective in situations where the driver does not want to apply engine braking too much, i.e., where the driver wants to reduce the speed gradually. For this purpose, a running mode setting unit is provided in the vehicle, more specifically in a controller such as an electric control unit (ECU), and automatically determines running conditions including road conditions and activates or deactivates the coasting mode.

For example, Japanese Unexamined Patent Application, Publication No. 2005-226701 discloses a technology in which a vehicle determines whether or not conditions for permitting freewheeling are met, and automatically disengages the clutch that connects the output shaft of the engine to the input shaft of the transmission to perform freewheeling.

Patent Document 1: Japanese Unexamined Patent Application, Publication No. 2005-226701

SUMMARY OF THE INVENTION

Since the running mode setting unit provided in the vehicle, more specifically in a controller such as an ECU, automatically selects and executes the activation and deactivation of the coasting mode, the driver cannot activate or deactivate the coasting mode at his/her discretion. In that sense, the technology disclosed in Japanese Unexamined Patent Application, Publication No. 2005-226701 has room for improvement.

The present invention was achieved in consideration of the above-described circumstances, and an object thereof is to provide a control apparatus for vehicle that enables a driver to activate and deactivate a freewheeling mode at his/her discretion. Thus, the present invention aims to contribute to an increase in energy efficiency.

(1) The present invention provides a control apparatus for vehicle (for example, a control apparatus 1 for vehicle described below) for switching a vehicle to a freewheeling mode in which power generated by a power source (for example, an engine 2 described below) of the vehicle is not transmitted to a drive shaft (for example, drive shafts 7 described below) of the vehicle. The control apparatus for vehicle includes: a decelerator (for example, an ECU 9 and a motor 15 described below) having a plurality of deceleration gear stages for changing deceleration of the vehicle; and a manipulator (for example, a manipulator 10 described below) provided on steering (for example, steering 11 described below) of the vehicle and configured to allow selection of the freewheeling mode in accordance with an operation performed by a driver. The vehicle transitions to the freewheeling mode upon the freewheeling mode being selected through an operation of the manipulator.

The control apparatus for vehicle according to the invention described in (1) enables the driver to switch the vehicle to the freewheeling mode at any time and with a single (manual) operation. More specifically, the control apparatus for vehicle enables the driver to start coasting or proactively set up a transition to coasting at any time and with a single (manual) operation, allowing for driver-initiated driving where the driver determines which situations are appropriate for reducing operational load and which are not, and thus enhancing the product effectiveness and attractiveness. Furthermore, the manipulator is provided on the steering (steering wheel). This configuration makes it easy for the driver to switch the vehicle to the freewheeling mode even when the driver is driving the vehicle, increasing the operability.

(2) In the control apparatus for vehicle described in (1), preferably, the manipulator is a shifter configured to allow shifts between the deceleration gear stages, and the shifter includes a first manipulator (for example, an UP paddle 10$a$ described below) enabled to cause a shift to a deceleration gear stage corresponding to a lower deceleration than a deceleration corresponding to a currently selected deceleration gear stage and a second manipulator (for example, a DOWN paddle 10$b$ described below) enabled to cause a shift to a deceleration gear stage corresponding to a higher deceleration than the deceleration corresponding to the currently selected deceleration gear stage, and the vehicle transitions to the freewheeling mode through an operation of either the first manipulator or the second manipulator.

The control apparatus for vehicle according to the invention described in (2) enables the driver to switch the vehicle to the freewheeling mode at any time and with a single (manual) operation, allowing for driver-initiated driving where the driver determines which situations are appropriate for reducing operational load and which are not, and thus enhancing the product effectiveness and attractiveness. Furthermore, the shifter (for example, a paddle shifter or a toggle switch) is provided for operation by the driver. This configuration allows the driver to perform intuitive operations.

(3) The control apparatus for vehicle described in (2) preferably has a fixed shift mode that allows shift between the plurality of deceleration gear stages based on an operation performed by the driver and an automatic shift mode that allows shift between the plurality of deceleration gear stages based on a running condition of the vehicle. Preferably, the shifter is a paddle shifter. Preferably, keeping the first manipulator in an operated state for a first predetermined period of time causes a transition to the automatic shift mode and the freewheeling mode, and keeping the first manipulator in the operated state for a second predetermined period of time, which is longer than the first predetermined period of time, causes a transition to the fixed shift mode and the freewheeling mode.

The control apparatus for vehicle according to the invention described in (3) enables the driver to switch the vehicle to a combination of the fixed shift mode and the freewheeling mode or to a combination of the automatic shift mode and the freewheeling mode by operating the first manipulator (UP paddle), enhancing the product effectiveness and attractiveness. The control apparatus for vehicle also enables the driver to switch the decelerator (automatic transmission) to a mode in line with the driver's intention based on an operation of the first manipulator, enhancing the product effectiveness and attractiveness.

(4) In the control apparatus for vehicle described in any one of (1) to (3), preferably, the freewheeling mode is deactivated through an operation of the second manipulator.

The control apparatus for vehicle according to the invention described in (4) enables the driver to deactivate the freewheeling mode by operating the second manipulator (DOWN paddle) rather than the first manipulator (UP paddle), which is used for switching the vehicle to the freewheeling mode. This configuration allows the driver to perform intuitive operations, enhancing the product effectiveness and attractiveness.

(5) The control apparatus for vehicle described in any one of (1) to (3) preferably further includes an accelerator operation detector (for example, an accelerator operation detector 13 described below) configured to detect an operation of an accelerator operator (for example, an accelerator operator 14 described below) performed by the driver when the control apparatus is in the automatic shift mode and the vehicle is in the freewheeling mode. Preferably, the freewheeling mode is deactivated upon the accelerator operation detector detecting the operation of the accelerator operator performed by the driver.

The control apparatus for vehicle according to the invention described in (5) enables the driver to deactivate the freewheeling mode by operating the accelerator operator. This configuration allows the driver to perform intuitive operations, enhancing the product effectiveness and attractiveness.

(6) In the control apparatus for vehicle described in (4), preferably, the plurality of deceleration gear stages include a first deceleration gear stage corresponding to a higher deceleration than a deceleration corresponding to a deceleration gear stage to be selected when the vehicle is in the freewheeling mode, and keeping the second manipulator in an operated state for the first predetermined period of time when the vehicle is in the freewheeling mode causes a shift to the first deceleration gear stage.

The control apparatus for vehicle according to the invention described in (6) enables the driver to shift the decelerator to the first deceleration gear stage for upshifting by operating the second manipulator (DOWN paddle) rather than the first manipulator (UP paddle), which is used for switching the vehicle to the freewheeling mode. This configuration allows the driver to perform intuitive operations, enhancing the product effectiveness and attractiveness.

(7) In the control apparatus for vehicle described in (6), preferably, keeping either the first manipulator or the second manipulator in the operated state for the second predetermined period of time when the vehicle is running in the first deceleration gear stage causes switching between the fixed shift mode and the automatic shift mode.

The control apparatus for vehicle according to the invention described in (7) enables the driver to switch the control apparatus between the fixed shift mode and the automatic shift mode by keeping the manipulator in the operated state for the second predetermined period of time. This configuration allows the driver to perform intuitive operations, enhancing the product effectiveness and attractiveness.

The present invention enables a driver to activate and deactivate a freewheeling mode at his/her discretion. Thus, the present invention can contribute to an increase in energy efficiency.

DETAILED DESCRIPTION OF THE INVENTION

The following describes an embodiment of the present invention in detail with reference to the accompanying drawings.

Figure 1:
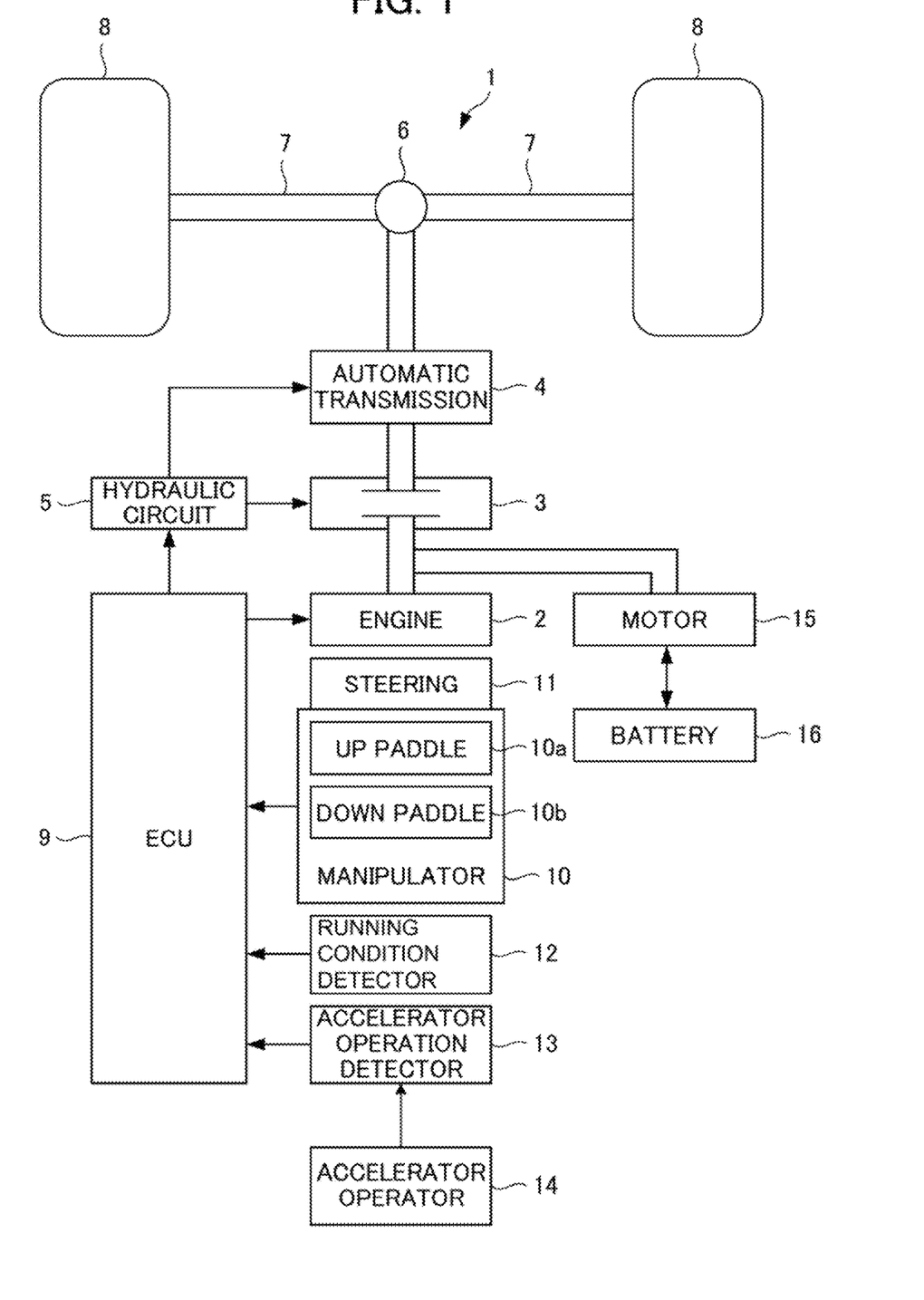
FIG. 1 is a schematic diagram illustrating a configuration of a control apparatus for vehicle according to an embodiment of the present invention.

First, a configuration of a control apparatus 1 for vehicle according to an embodiment of the present invention will be described with reference to FIG. 1. FIG. 1 is a schematic diagram illustrating the configuration of the control apparatus 1 for vehicle according to the embodiment of the present invention.

The control apparatus 1 for vehicle shown in FIG. 1 can switch the vehicle from a D range, which is a running mode to be used for normal running, to a freewheeling mode, in which power generated by an engine 2 is not transmitted to a pair of left and right drive shafts 7. The control apparatus 1 for vehicle has a fixed shift mode that allows shift between a plurality of deceleration gear stages based on a driver's operation and an automatic shift mode that allows shift between the plurality of deceleration gear stages based on a running condition of the vehicle.

Specifically, the control apparatus 1 for vehicle includes, for example, the engine (power source) 2, a clutch 3, an automatic transmission (decelerator) 4, a hydraulic circuit 5, a differential mechanism 6, the pair of left and right drive shafts 7, a pair of left and right drive wheels 8, an electric control unit (ECU) 9, a manipulator (shifter or paddle shifter) 10 including an UP paddle 10a and a DOWN paddle 10b, steering 11, a running condition detector 12, an accelerator operation detector 13, an accelerator operator 14, a motor 15, and a battery 16.

The engine 2 is a power source that generates power for driving the vehicle. The present embodiment adopts a hybrid engine that combines the motor 15 and the engine 2, but is not limited as such. The power generated by the hybrid engine is transmitted through the clutch 3, the automatic transmission 4, and the differential mechanism 6 to the pair of left and right drive shafts 7 having the pair of left and right drive wheels 8 attached thereto.

The clutch 3 disconnects a transmission path for transmitting the power generated by the hybrid engine to the pair of left and right drive shafts 7 according to the pressure (hydraulic pressure) generated by hydraulic oil supplied from the hydraulic circuit 5. The clutch 3 disconnects the transmission path for transmitting the power generated by the hybrid engine to the pair of left and right drive shafts 7 when the vehicle has been switched to the freewheeling mode.

The automatic transmission 4 adjusts the gear ratio according to the pressure (hydraulic pressure) generated by the hydraulic oil supplied from the hydraulic circuit 5.

The hydraulic circuit 5 supplies the pressure (hydraulic pressure) generated by the hydraulic oil to the clutch 3 and the automatic transmission 4 based on control by the ECU 9.

The differential mechanism 6 distributes the power generated by the hybrid engine and transmitted through the clutch 3 and the automatic transmission 4 to the pair of left and right drive shafts 7. The pair of left and right drive wheels 8 are respectively attached to the pair of left and right drive shafts 7. The pair of left and right drive wheels 8 convert the power transmitted through the pair of left and right drive shafts 7 into propelling force for the vehicle.

The ECU 9 controls, for example, the engine 2, the motor 15, the battery 16, and the hydraulic circuit 5 based on inputs from the manipulator 10, the running condition detector 12, and the accelerator operation detector 13. The ECU 9 reads and executes a computer program stored in memory (not shown) to perform various processes.

The ECU 9 and the motor 15 form the decelerator of the present embodiment. The decelerator of the present embodiment has a plurality of deceleration gear stages for changing the deceleration of the vehicle. The plurality of deceleration gear stages include a first deceleration gear stage corresponding to a higher deceleration than a deceleration corresponding to a deceleration gear stage to be selected when the vehicle runs in the freewheeling mode.

The motor 15 generates driving force when the driver accelerates the vehicle by pressing on the accelerator operator 14 (accelerator pedal). On the other hand, when the driver decelerates the vehicle by lifting his/her foot off the accelerator operator 14, opposite force acts and the motor 15 functions as a generator. The force required for this electric power generation serves as resistance to the rotation of the drive wheels 8 and functions as regenerative braking. The decelerator of the present embodiment can change the intensity of the regenerative braking in stages by controlling the rotation of the motor 15 using the ECU 9. Specifically, the decelerator of the present embodiment can change the deceleration of the vehicle in stages in accordance with the driver's operation of the UP paddle 10*a* and the DOWN paddle 10*b*, which is referred to as a deceleration selector described below.

The manipulator 10 is provided on the steering 11 and allows selection of the freewheeling mode in accordance with the driver's operation. The vehicle transitions to the freewheeling mode upon the freewheeling mode being selected through an operation of the manipulator 10.

The manipulator 10 is a shifter configured to change deceleration gear stages. The manipulator 10, or the shifter, includes the UP paddle (first manipulator) 10*a* and the DOWN paddle (second manipulator) 10*b*. The UP paddle 10*a* is enabled to cause a shift to a deceleration gear stage corresponding to a lower deceleration than a deceleration corresponding to the currently selected deceleration gear stage. The DOWN paddle 10*b* is enabled to cause a shift to a deceleration gear stage corresponding to a higher deceleration than the deceleration corresponding to the currently selected deceleration gear stage. The vehicle transitions to the freewheeling mode through an operation of the UP paddle 10*a*.

The manipulator 10, or the shifter, is a paddle shifter. Keeping the UP paddle 10*a* in an operated state for a first predetermined period of time causes a transition to the automatic shift mode and the freewheeling mode. Keeping the UP paddle 10*a* in the operated state for a second predetermined period of time, which is longer than the first predetermined period of time, causes a transition to the fixed shift mode and the freewheeling mode.

The freewheeling mode is deactivated through an operation of the DOWN paddle 10*b*.

Keeping the DOWN paddle 10*b* in an operated state for the first predetermined period of time when the vehicle is in the freewheeling mode causes a shift to the first deceleration gear stage.

Keeping either the UP paddle 10*a* or the DOWN paddle 10*b* in the operated state for the second predetermined period of time, which is longer than the first predetermined period of time, when the vehicle is running in the first deceleration gear stage causes switching between the fixed shift mode and the automatic shift mode.

The running condition detector 12 detects a running condition of the vehicle. The running condition detector 12 inputs a detection signal indicating the detected running condition of the vehicle to the ECU 9.

The accelerator operation detector 13 detects a driver's operation of the accelerator operator 14 when the control apparatus 1 is in the automatic shift mode and the vehicle is in the freewheeling mode. The accelerator operation detector 13 inputs a resulting detection signal to the ECU 9 upon detecting an operation of the accelerator operator 14. The freewheeling mode is deactivated upon the accelerator operation detector 13 detecting a driver's operation of the accelerator operator 14.

The motor 15 is rotated by the power from the engine 2 to generate electric power. The motor 15 also serves as a power source that generates power for driving the vehicle using electric power from the battery 16.

The battery 16 charges with the electric power generated by the motor 15.

Figure 2:
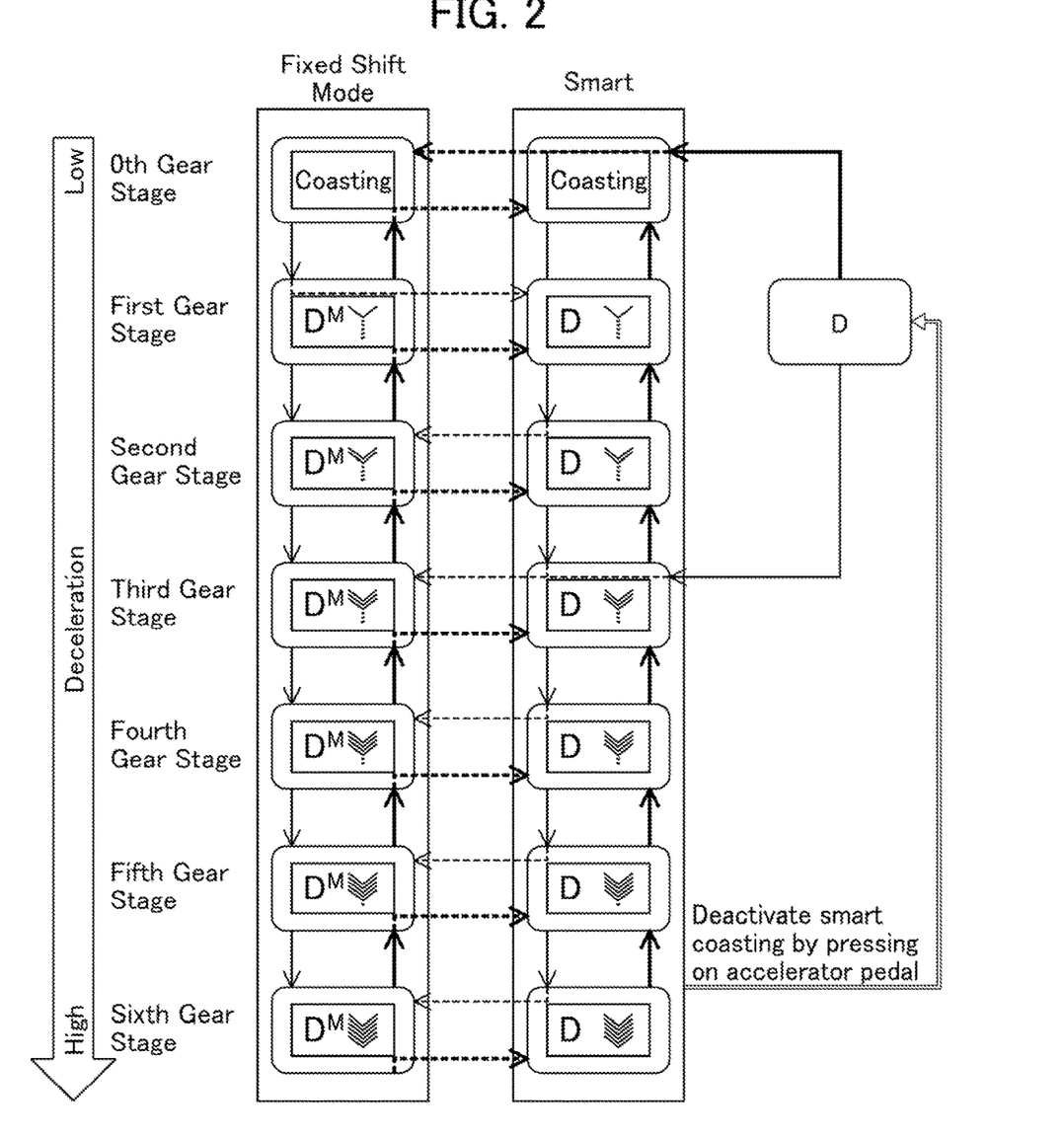
FIG. 2 is a schematic diagram for explaining transitions between a plurality of deceleration gear stages.
Figure 3:
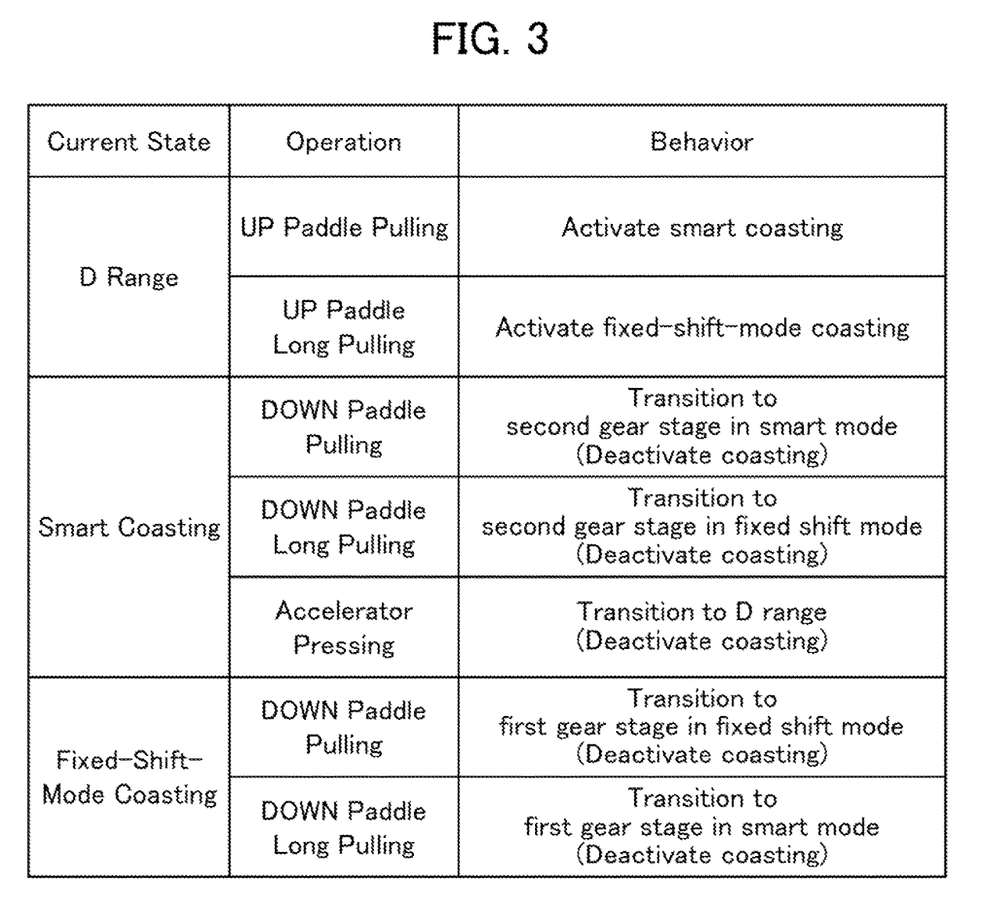
FIG. 3 is a list showing the relationship between the current state of running mode, operation, and behavior.

Next, the plurality of deceleration gear stages and transitions therebetween in the decelerator of the present embodiment will be described with reference to FIGS. 2 and 3. FIG. 2 is a schematic diagram for explaining transitions between the plurality of deceleration gear stages. FIG. 3 is a list showing the relationship between the current state of running mode, operation, and behavior.

As shown in FIG. 2, the plurality of deceleration gear stages include a 0th deceleration gear stage, which is selected when the vehicle runs in the freewheeling mode (coasting mode), a first deceleration gear stage, which is selected when the vehicle runs in the freewheeling mode and corresponds to a higher deceleration than a deceleration corresponding to the 0th deceleration gear stage, a second deceleration gear stage, which corresponds to a higher deceleration than the deceleration corresponding to the first deceleration gear stage, a third deceleration gear stage, which corresponds to a higher deceleration than the deceleration corresponding to the second deceleration gear stage, a fourth deceleration gear stage, which corresponds to a higher deceleration than the deceleration corresponding to the third deceleration gear stage, a fifth deceleration gear stage, which corresponds to a higher deceleration than the deceleration corresponding to the fourth deceleration gear stage, and a sixth deceleration gear stage, which corresponds to a higher deceleration than the deceleration corresponding to the fifth deceleration gear stage.

As shown in FIGS. 2 and 3, "UP paddle pulling", which means keeping the UP paddle 10*a* in the operated state for the first predetermined period of time, performed when the running mode is "D range", which is used for normal running, activates smart coasting, and causes a transition to the automatic shift mode and the freewheeling mode (coasting mode), which in other words is a shift to the 0th gear stage in the automatic shift mode.

The smart coasting is intended to be used in situations where the distance to a distant target is being adjusted. Specific examples of such situations include a situation where the driver wants to decelerate the vehicle gently to adjust the following distance to a vehicle ahead because there is an adequate distance between the vehicles, and a situation where the driver wants to decelerate the vehicle gently to adjust the vehicle speed and the distance to an intersection because there is an adequate distance between the vehicle and the intersection. In these situations, the UP paddle 10a is used to ease off the deceleration force for a gentle deceleration, and the running mode automatically returns to the D range when the driver re-accelerates the vehicle, as described below.

"UP paddle long pulling", which means keeping the UP paddle 10a in the operated state for the second predetermined period of time longer than the first predetermined period of time, performed when the running mode is "D range" activates fixed-shift-mode coasting, and causes a transition to the fixed shift mode and the freewheeling mode (coasting mode), which in other words is a shift to the 0th gear stage in the fixed shift mode.

The fixed-shift-mode coasting is intended to be used in situations where the driver wants to increase the range of deceleration control with the use of the accelerator operator 14 to improve acceleration controllability. Specific examples of such situations include a situation where the vehicle is following a vehicle ahead with a narrow following distance due to traffic congestion and the driver wants to decelerate the vehicle gently to adjust the following distance, and a situation where the driver wants to effortlessly drive the vehicle downhill on a slope where the vehicle is expected to run at a constant speed or accelerate, without the vehicle accelerating or decelerating due to the gradient of the slope.

"Down paddle pulling", which means keeping the DOWN paddle 10b in the operated state for the first predetermined period of time, performed when the running mode is "smart coasting" deactivates the freewheeling mode and causes a shift to the second deceleration gear stage in the automatic shift mode.

"DOWN paddle long pulling", which means keeping the DOWN paddle 10b in the operated state for the second predetermined period of time, performed when the running mode is "smart coasting" deactivates the freewheeling mode, and causes a transition from the automatic shift mode to the fixed shift mode, which in other words is a shift to the second gear stage in the fixed shift mode.

Upon the accelerator operation detector 13 detecting a driver's operation of the accelerator operator 14 when the running mode is "smart coasting", the freewheeling mode is deactivated and the running mode transitions to "D range".

"Down paddle pulling", which means keeping the DOWN paddle 10b in the operated state for the first predetermined period of time, performed when the running mode is "fixed-shift-mode coasting" deactivates the freewheeling mode and causes a shift to the first gear stage in the fixed shift mode.

"DOWN paddle long pulling", which means keeping the DOWN paddle 10b in the operated state for the second predetermined period of time, performed when the running mode is "fixed-shift-mode coasting" deactivates the freewheeling mode, and causes a transition from the fixed shift mode to the automatic shift mode, which in other words is a shift to the first gear stage in the automatic shift mode.

The control apparatus 1 for vehicle enables the driver to switch the vehicle to the freewheeling mode at any time and with a single (manual) operation. More specifically, the control apparatus 1 for vehicle enables the driver to start the coasting or proactively set up a transition to the coasting at any time and with a single (manual) operation, allowing for driver-initiated driving where the driver determines which situations are appropriate for reducing operational load and which are not, and thus enhancing the product effectiveness and attractiveness. Furthermore, the manipulator 10 is provided on the steering (steering wheel) 11. This configuration makes it easy for the driver to switch the vehicle to the freewheeling mode even when the driver is driving the vehicle, increasing the operability.

The word "driver-initiated" suggests the capability to provide a driving environment based on the driver's intentions. For example, in a situation where the driver wants to actively accelerate and decelerate the vehicle at his/her discretion while driving on a winding road, the running mode is kept from switching to the coasting mode, giving priority to the enjoyment of maneuvering the vehicle. In a situation where the driver prefers fuel-efficient driving, the running mode is permitted to switch to the coasting mode for the vehicle to coast.

The control apparatus 1 for vehicle also enables the driver to switch the vehicle to the freewheeling mode at any time and with a single (manual) operation, allowing for driver-initiated driving where the driver determines which situations are appropriate for reducing operational load and which are not, and thus enhancing the product effectiveness and attractiveness. Furthermore, the manipulator 10, which is a shifter (for example, a paddle shifter (the UP paddle 10a and the DOWN paddle 10b) or a toggle switch) is provided for the driver's operation. This configuration allows the driver to perform intuitive operations.

The control apparatus 1 for vehicle also enables the driver to switch the vehicle to a combination of the fixed shift mode and the freewheeling mode or to a combination of the automatic shift mode and the freewheeling mode by operating the UP paddle (first manipulator) 10a, enhancing the product effectiveness and attractiveness. The control apparatus 1 for vehicle also enables the driver to switch the automatic transmission (decelerator) 4 to a mode in line with the driver's intention based on an operation of the UP paddle (first manipulator) 10a, enhancing the product effectiveness and attractiveness.

The control apparatus 1 for vehicle also enables the driver to deactivate the freewheeling mode by operating the DOWN paddle (second manipulator) 10b rather than the UP paddle (first manipulator) 10a, which is used for switching the vehicle to the freewheeling mode. This configuration allows the driver to perform intuitive operations, enhancing the product effectiveness and attractiveness.

The control apparatus 1 for vehicle also enables the driver to deactivate the freewheeling mode by operating the accelerator operator 14. This configuration allows the driver to perform intuitive operations, enhancing the product effectiveness and attractiveness.

The control apparatus 1 for vehicle also enables the driver to shift the decelerator to the first deceleration gear stage for upshifting by operating the DOWN paddle (second manipulator) 10b rather than the UP paddle (first manipulator) 10a, which is used for switching the vehicle to the freewheeling mode. This configuration allows the driver to perform intuitive operations, enhancing the product effectiveness and attractiveness.

The control apparatus 1 for vehicle also enables the driver to switch the control apparatus between the fixed shift mode and the automatic shift mode by keeping the manipulator 10 in the operated state for the second predetermined period of time. This configuration allows the driver to perform intuitive operations, enhancing the product effectiveness and attractiveness.

Finally, the following summarizes the characteristics of the freewheeling mode (coasting mode) in the control apparatus 1 for vehicle that enables the driver to switch the vehicle to the freewheeling mode through a manual operation.

First, the freewheeling mode in the control apparatus 1 for vehicle according to the present embodiment is activated or deactivated through the driver's operation. The freewheeling mode of the present embodiment is designed to reduce operational load, and the driver determines which situations are appropriate for reducing operational load and which are not.

The driver can select the freewheeling mode of the present embodiment through a single operation of the UP paddle 10a. The driver can activate the freewheeling mode quickly and safely when needed, through a single operation without taking his/her hands off the steering (steering wheel) 11 while driving.

The freewheeling mode of the present embodiment is set in combination with the automatic shift mode or the fixed shift mode. For example, the driver can temporarily activate the freewheeling mode to drive the vehicle in the case of an intersection, and intermittently activate the freewheeling mode when driving the vehicle downhill on a long slope. Thus, the driver can select and use the automatic shift mode or the fixed shift mode depending on the driving situation.

It should be noted that the present invention is not limited to the embodiment described above, and encompasses changes such as modifications and improvements to the extent that the object of the present invention is achieved.

The foregoing embodiment has been described using an example in which the vehicle transitions to the freewheeling mode through an operation of the UP paddle 10a. However, the present invention is not limited as such, and may have a different configuration as long as the vehicle transitions to the freewheeling mode through an operation of either the UP paddle 10a or the DOWN paddle 10b. That is, the present invention may have a configuration in which the vehicle transitions to the freewheeling mode through an operation of the DOWN paddle 10b.

EXPLANATION OF REFERENCE NUMERALS

1: Control apparatus for vehicle
2: Engine (power source)
3: Clutch
4: Automatic transmission
5: Hydraulic circuit
6: Differential mechanism
7: Drive shaft
8: Drive wheel
9: ECU (decelerator)
10: Manipulator (shifter or paddle shifter)
10a: UP paddle (first manipulator)
10b: DOWN paddle (second manipulator)
11: Steering
12: Running condition detector
13: Accelerator operation detector
14: Accelerator operator
15: Motor (decelerator)
16: Battery

What is claimed is:

1. A control apparatus for vehicle for switching a vehicle to a freewheeling mode in which power generated by a power source of the vehicle is not transmitted to a drive shaft of the vehicle, the control apparatus comprising:
    a decelerator having a plurality of deceleration gear stages for changing deceleration of the vehicle; and
    a manipulator provided on steering of the vehicle and configured to allow selection of the freewheeling mode in accordance with an operation performed by a driver, wherein
    the vehicle transitions to the freewheeling mode upon the freewheeling mode being selected through an operation of the manipulator, wherein
    the manipulator is a shifter configured to allow shifts between the deceleration gear stages, and
    the shifter includes
    a first manipulator enabled to cause a shift to a deceleration gear stage corresponding to a lower deceleration than a deceleration corresponding to a currently selected deceleration gear stage and
    a second manipulator enabled to cause a shift to a deceleration gear stage corresponding to a higher deceleration than the deceleration corresponding to the currently selected deceleration gear stage, and
    the vehicle transitions to the freewheeling mode through an operation of either the first manipulator or the second manipulator, and
    a fixed shift mode that allows shift between the plurality of deceleration gear stages based on an operation performed by the driver, and
    an automatic shift mode that allows shift between the plurality of deceleration gear stages based on a running condition of the vehicle, wherein
    the shifter is a paddle shifter,
    keeping the first manipulator in an operated state for a first predetermined period of time causes a transition to the automatic shift mode and the freewheeling mode, and
    keeping the first manipulator in the operated state for a second predetermined period of time causes a transition to the fixed shift mode and the freewheeling mode the second predetermined period of time being longer than the first predetermined period of time.

2. The control apparatus for vehicle according to claim 1, wherein
    the freewheeling mode is deactivated through an operation of the second manipulator.

3. The control apparatus for vehicle according to claim 1, further comprising
    an accelerator operation detector configured to detect an operation of an accelerator operator performed by the driver when the control apparatus is in the automatic shift mode and the vehicle is in the freewheeling mode, wherein
    the freewheeling mode is deactivated upon the accelerator operation detector detecting the operation of the accelerator operator performed by the driver.

4. The control apparatus for vehicle according to claim 2, wherein
    the plurality of deceleration gear stages include a first deceleration gear stage corresponding to a higher deceleration than a deceleration corresponding to a deceleration gear stage to be selected when the vehicle is in the freewheeling mode, and keeping the second manipulator in an operated state for the first predetermined period of time when the vehicle is in the freewheeling mode causes a shift to the first deceleration gear stage.

5. The control apparatus for vehicle according to claim 4, wherein keeping either the first manipulator or the second manipulator in the operated state for the second predetermined period of time when the vehicle is running in the first deceleration gear stage causes switching between the fixed shift mode and the automatic shift mode.

\* \* \* \* \*